UNITED STATES PATENT OFFICE.

JONATHAN BOYD, OF PROVIDENCE, RHODE ISLAND.

PROCESS OF PRODUCING WATER-PROOF GUM FROM FLAX.

SPECIFICATION forming part of Letters Patent No. 258,277, dated May 23, 1882.

Application filed April 24, 1882. (No specimens.)

*To all whom it may concern:*

Be it known that I, JONATHAN BOYD, of the city and county of Providence, and State of Rhode Island, have invented a new and useful Improvement in Process for Producing Water-Proof Gum from Flax, of which the following is a specification.

This invention has reference to the production of a gum having some of the properties of caoutchouc, and applicable to many purposes for which india-rubber is now used, from the woody fiber of flax. I have ascertained by practical tests that the stems of the flax-plant and the woody portion contain a fatty wax-like substance, which can be used in the arts as a substitute for caoutchouc and india-rubber, and which can be separated from the flax in such a manner that the fiber is much benefited by the removal of the wax.

I will now more fully describe my process for separating the fatty wax and producing the gum therefrom.

The flax which is to be subjected to my process should be pulled before the capsules are quite ripe, when the seeds are yet milky, and when the capsules are just beginning to change from green to pale brown, as in this state the woody core is more readily affected and the fiber separated. I place the flax into a box made of sufficient depth to receive a perforated false bottom, six to eight inches from the bottom of the box, and a space of such height as will allow the flax to stand on the perforated bottom upright and be inclosed by a tight-fitting cover. Into this box I closely pack the flax, with the root ends resting on the perforated bottom, and then close the same. I now fill the box about two-thirds with water. A steam-coil is placed into the box under the perforated false bottom, and when the box is closed steam is turned on sufficient to raise the temperature of the water to from 80° to 95° Fahrenheit. This temperature is maintained for from six to ten hours, according to the nature of the flax and the soil in which it is grown, which can be ascertained by experiments. The water is now drawn off and preserved for evaporation and steam of a low pressure is turned on the box, so as to thoroughly steam the flax. The time and pressure may also be varied with the nature of the flax. I find that one hour's steaming usually separates the fatty matter sufficiently to be expelled by pressure. After steaming the flax the steam is turned off, the box is opened, and the flax is thoroughly saturated with water containing a small percentage of carbonate of soda—say from four to seven per cent.—the water being acidulated with half per cent. of sulphuric acid, more or less, and the box is again closed, and the process of steaming is repeated. The flax is now subjected to pressure in a hydraulic press and the fatty matter separated by the pressure. It may also be pressed between rolls in a roller-press similar to the sugar-cane presses. The fatty matter is now strained and reduced by evaporation until a gummy wax-like substance is produced hard enough to be worked in the same manner as india-rubber is worked.

I find that this gum can be rolled into sheets in the same manner as india-rubber, and that when dissolved like india-rubber it makes a water-proof coating, suitable for the finest cambric or the coarsest of cloth.

In this process the time during which the flax is first subjected to the water treatment can be increased until fermentation sets in, which can be readily ascertained by the repulsive smell of the gases, and a small percentage of carbonate of soda may be put into the water.

I do not wish to limit myself to the exact process as herein set forth, as I find that a large percentage of the gum can be extracted from the flax by either subjecting the same to the hot-water process without the steaming, or by the steaming process without the previous steeping in the heated water, although I prefer to combine the two, as the quantity of gum is greater and the flax is in a better condition for separating the fibers, thus saving the time usually required for "retting."

Having thus described my invention, I claim as new and desire to secure by Letters Patent—

1. The art of producing water-proof gum from the flax-plant by subjecting the plant to the process of softening, as described, removing the fatty matter by pressure, and concentrating the same by evaporation.

2. As a new article of manufacture, a gum having the consistency of india-rubber, made from the flax-plant, as described.

JONATHAN BOYD.

Witnesses:
H. J. MILLER,
WM. L. COOP.